United States Patent
Foster et al.

(10) Patent No.: US 7,120,823 B2
(45) Date of Patent: Oct. 10, 2006

(54) METHOD AND APPARATUS FOR RECOVERING LOGICAL PARTITION CONFIGURATION DATA

(75) Inventors: Robert Kimberlin Foster, Austin, TX (US); Charles Andrew McLaughlin, Round Rock, TX (US); Joy Mei-Jen Underhill, Round Rock, TX (US); Christine Wang, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 10/418,468

(22) Filed: Apr. 17, 2003

(65) Prior Publication Data

US 2004/0210792 A1 Oct. 21, 2004

(51) Int. Cl.
*G06F 11/00* (2006.01)
(52) U.S. Cl. .......................................... 714/6
(58) Field of Classification Search .................. 714/6, 714/13
See application file for complete search history.

(56) References Cited

U.S. PATENT DOCUMENTS

| | | | | |
|---|---|---|---|---|
| 5,257,379 | A | 10/1993 | Cwiakala et al. | 395/700 |
| 5,357,608 | A | 10/1994 | Bartow et al. | 395/200 |
| 5,625,820 | A | 4/1997 | Hermsmeier et al. | 395/618 |
| 5,805,906 | A | 9/1998 | Cheong et al. | 395/733 |
| 5,815,649 | A | 9/1998 | Utter et al. | 395/112.04 |
| 5,854,896 | A | 12/1998 | Brenner et al. | 395/200.51 |
| 5,907,672 | A * | 5/1999 | Matze et al. | 714/8 |
| 6,003,075 | A | 12/1999 | Arendt et al. | 709/221 |
| 6,199,179 | B1 | 3/2001 | Kauffman et al. | 714/26 |
| 6,205,527 | B1 * | 3/2001 | Goshey et al. | 711/162 |
| 6,253,224 | B1 | 6/2001 | Brice, Jr. et al. | 709/1 |
| 6,366,987 | B1 | 4/2002 | Tzelnic et al. | 711/162 |
| 6,430,663 | B1 | 8/2002 | Ding | 711/162 |
| 6,438,671 | B1 | 8/2002 | Doing et al. | 711/173 |
| 6,457,050 | B1 | 9/2002 | Cowan et al. | 709/224 |
| 6,625,703 | B1 * | 9/2003 | Goodman et al. | 711/162 |
| 2002/0042892 | A1 * | 4/2002 | Gold | 714/6 |
| 2002/0069363 | A1 * | 6/2002 | Winburn | 713/200 |
| 2002/0194528 | A1 * | 12/2002 | Hart | 714/6 |
| 2005/0108486 | A1 * | 5/2005 | Sandorfi | 711/162 |

FOREIGN PATENT DOCUMENTS

EP 0712079 5/1996

* cited by examiner

*Primary Examiner*—Scott Baderman
*Assistant Examiner*—Brian Assessor
(74) *Attorney, Agent, or Firm*—Duke W. Yee; Thomas E. Tyson; Francis Lammes (57) ABSTRACT

The present invention provides a method, apparatus, and computer instructions for recovering an image of partition configuration information data for a set of partitions having at least one affinity partition in a logical partition data processing system. (Damage to an image of partition configuration data is detected. Current partition data is compared with a backup partition data. A merger of the current partition configuration data is made with the backup logical partition data if a conflict is present between the current partition configuration data and the backup partition data. The merger is performed in a manner avoiding stopping an operation on a running partition in the set of partitions.

18 Claims, 5 Drawing Sheets

| PARTITION ID | PARTITION NAME | PARTITION TYPE | PROFILES |
|---|---|---|---|
| 1 | lpar01 | LPAR | lprof1-1, prof1-2 |
| 2 | lpar 02 | LPAR | lprof2-1 |
| 3 | lpar 03 | LPAR | lpar3-1, lprof3-2 |
| 4 | alpar 04 | ALPAR | aprof4-1, alprof4-2 |
| 5 | alpar05 | ALPAR | aprofr5-1 |
| 6 | alpar06 | ALPAR | aprof6-1 |
| 7 | alpar07 | ALPAR | aprof7-1 |

*FIG. 5*

| PARTITION | PARTITION NAME | PARTITION TYPE | PROFILES |
|---|---|---|---|
| 1 | lpar01 | LPAR | lprof01-1 |
| 3 | alpar03 | ALPAR | aprof03-1 |
| 4 | alpar04 | ALPAR | aprof04-1, aprof04-3 |
| 5 | alpar05 | ALPAR | aprof05-5 |
| 6 | alpar06 | ALPAR | aprof06-1 |
| 7 | lpar07 | LPAR | lprof07-1, lprof07-2 |
| 8 | lpar08 | LPAR | lprof08-1 |

*FIG. 6*

| PARTITION | PARTITION NAME | PARTITION TYPE | PROFILES |
|---|---|---|---|
| 1 | lpar01 | LPAR | lprof1-1, prof1-2 |
| 2 | lpar02 | LPAR | lprof2-1 |
| 3 | alpar03 | ALPAR | aprof03-1 |
| 4 | alpar04 | ALPAR | aprof04-1, aprof04-3 |
| 5 | alpar05 | ALPAR | aprof05-5 |
| 6 | alpar06 | ALPAR | aprof06-1 |
| 7 | lpar07 | LPAR | lprof07-1, lprof07-2 |
| 8 | lpar08 | LPAR | lprof08-1 |

METHOD AND APPARATUS FOR RECOVERING LOGICAL PARTITION CONFIGURATION DATA

BACKGROUND OF THE INVENTION

1. Technical Field

The present invention relates generally to an improved data processing system and in particular, a method, apparatus, and computer instructions for managing configuration data. Still more particular, the present invention provides a method, apparatus, and computer instructions for recovering logical partition data in a logical partitioned data processing system.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

With respect to hardware resources in a LPAR system, these resources are disjointly shared among various partitions, themselves disjoint, each one seeming to be a stand-alone computer. These resources may include, for example, input/output (I/O) adapters, memory dimms, nonvolatile random access memory (NVRAM), and hard disk drives. Each partition within the LPAR system may be booted and shutdown over and over without having to power-cycle the whole system.

The LPAR system may have two types of partitions, a logical type of partition and an affinity partition. Logical partitions are user-defined system resource divisions. With respect to logical partitions, a user determines the number of processors, memory, and I/O that a logical partition can have when the logical partition is active. An affinity partition is a special type of logical partition. Affinity partitions are divisions of system-defined resources that have a close physical proximity. When an affinity partition is created, the system determines the number of processors and memory that that partition can have, but the user determines the I/O requirements for this type of partition.

Configuration data for partitions are typically stored in a nonvolatile random access memory (NVRAM) for a service processor. When configuration data is needed, this data is pulled from the NVRAM to the hardware management console used to manage the LPAR data processing system. Situations occur in which this NVRAM may be cleared or corrupted. As a result, a recovery action is required for these situations. Otherwise, users are required to recreate this partition configuration data every time such a loss occurs.

Currently, a current image copy of the configuration data is saved on some regular basis to allow recovery of the configuration data when a loss is detected. Currently available recovery processes require stopping operations on the partitions while performing recovery processes because these recovery processes may overwrite configuration data for partitions currently executing. Situations occur, however, in which users are running critical or important operations on an affinity partition, and it is desirable to avoid stopping execution of that partition to restore configuration data.

Normally, profile data is merged to recreate or restore configuration data. With affinity partitions, in many cases, only a limited number of affinity partitions may be allowed. If the mirror image and the backup image have significant differences, a situation in which the number of affinity partitions may be greater in the restored profile than what is allowed or partition configuration data is inconsistent with partition types. Such situations put systems in inconsistent states. User may not able to recover from the situation. When this situation happens, users will not able to continue on using hardware management system to manage the partitions. In order to get out of this situation, users will have initialize the system which in turn stops all running partitions, delete them, and create them according to the configuration users have saved away.

With current recovery mechanism, it simply combines configuration data from backup and mirror images. With no knowledge of affinity partitions, this recovery mechanism simply overwrites the partition types that are currently defined. Because a partition type cannot be changed at runtime, the result of modifying the partition type would put the system and the partitions in undesirable and inconsistent states. This situation may indirectly cause termination of partition in order to put system back to a consistent state.

Therefore, it would be advantageous to have an improved method, apparatus, and computer instructions for recovering configuration data in LPAR systems containing affinity partitions without interrupting operations on those partitions.

SUMMARY OF THE INVENTION

The present invention provides a method, apparatus, and computer instructions for recovering an image of partition configuration information data for a set of partitions having at least one affinity partition in a logical partition data processing system. Damage to an image of partition configuration data is detected. Current partition data is compared with a backup partition data when damage is detected. A merger of the current partition configuration data is made with the backup logical partition data if a conflict is present between the current partition configuration data and the backup partition data. The merger is performed in a manner avoiding stopping an operation on a running partition in the set of partitions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
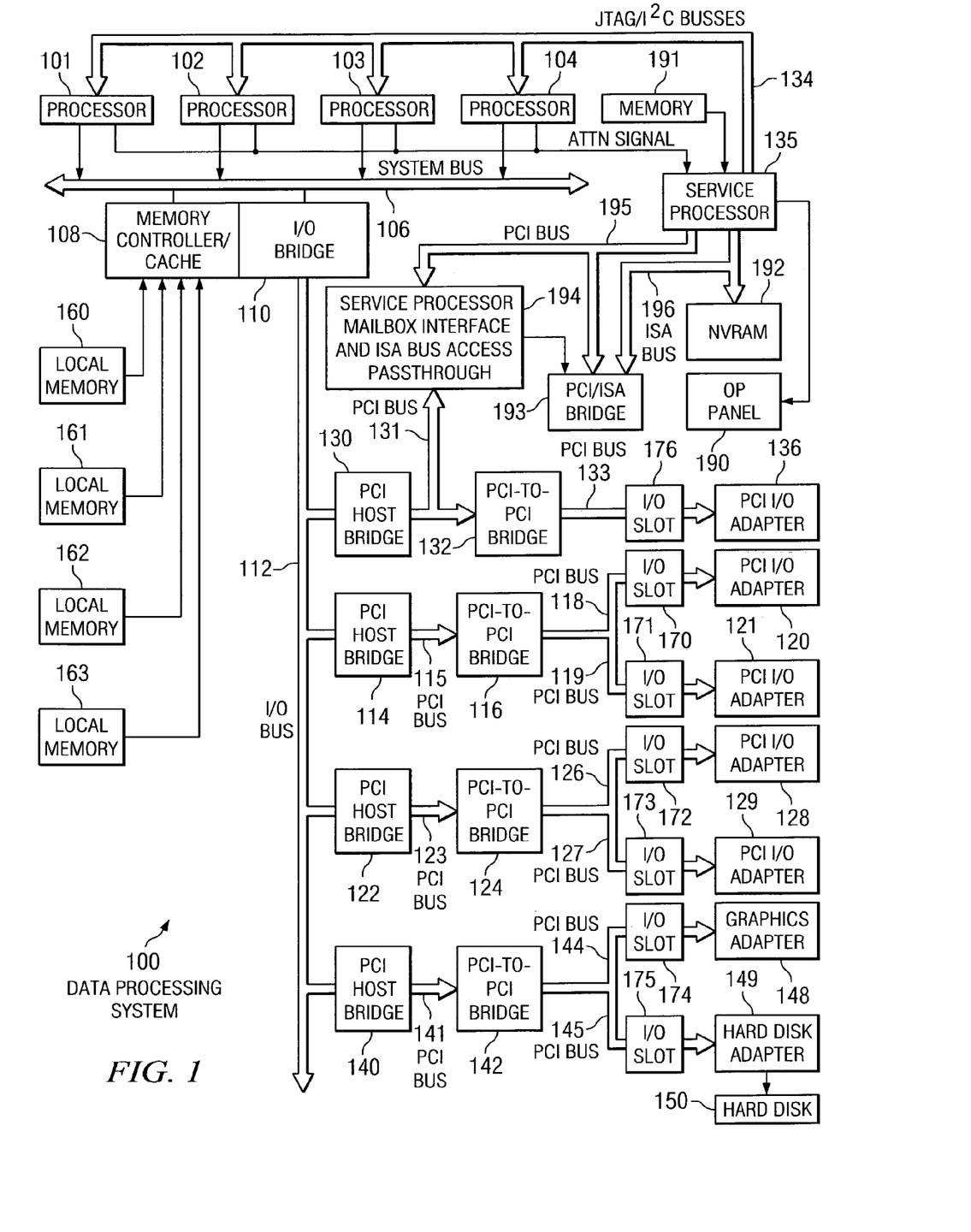
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and each of local memories 160–163 is assigned to one of the three partitions. For example, processor 101, local memory 160, and I/O adapters 120, 128, and 129 may be assigned to logical partition P1; processors 102–103, local memory 161, and PCI I/O adapters 121 and 136 may be assigned to partition P2; and processor 104, local memories 162–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P1. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases host processors 101–104 for execution of the code loaded into local memory 160–163. While host processors 101–104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
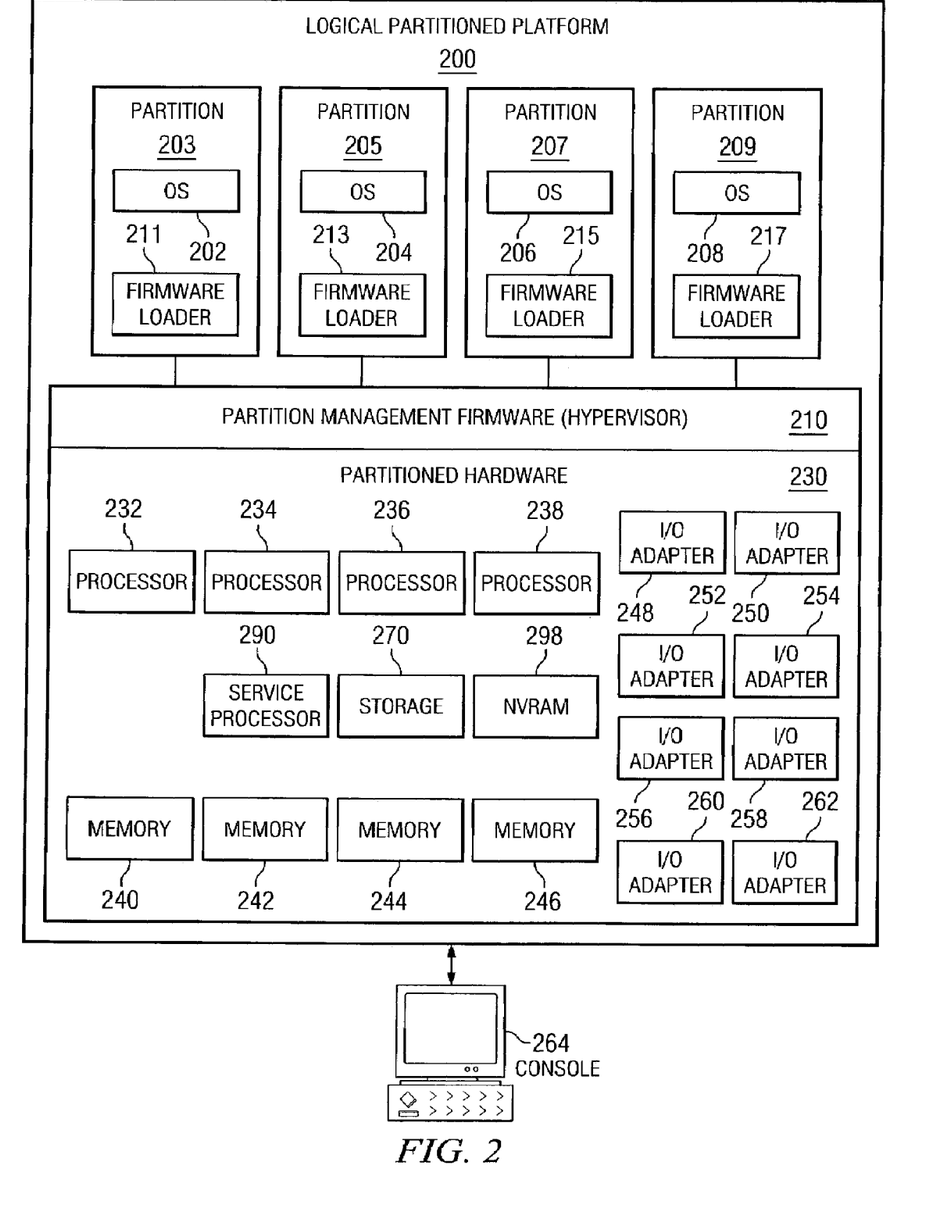
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the hypervisor's partition manager. The processors associated or assigned to the partitions are then dispatched to the partition's memory to execute the partition firmware.

Partitioned hardware 230 includes a plurality of processors 232–238, a plurality of system memory units 240–246, a plurality of input/output (I/O) adapters 248–262, and a storage unit 270. Partitioned hardware 230 also includes service processor 290, which may be used to provide various services, such as processing of errors in the partitions. Each of the processors 232–238, memory units 240–246, NVRAM storage 298, and I/O adapters 248–262 may be assigned to one of multiple partitions within logical partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 210 allows the simultaneous execution of independent OS images 202, 204, 206, and 208 by virtualizing all the hardware resources of logical partitioned platform 200.

Operations of the different partitions may be controlled through a hardware management console, such as console 264. Console 264 is a separate data processing system from which a system administrator may perform various functions including reallocation of resources to different partitions.

Figure 3:
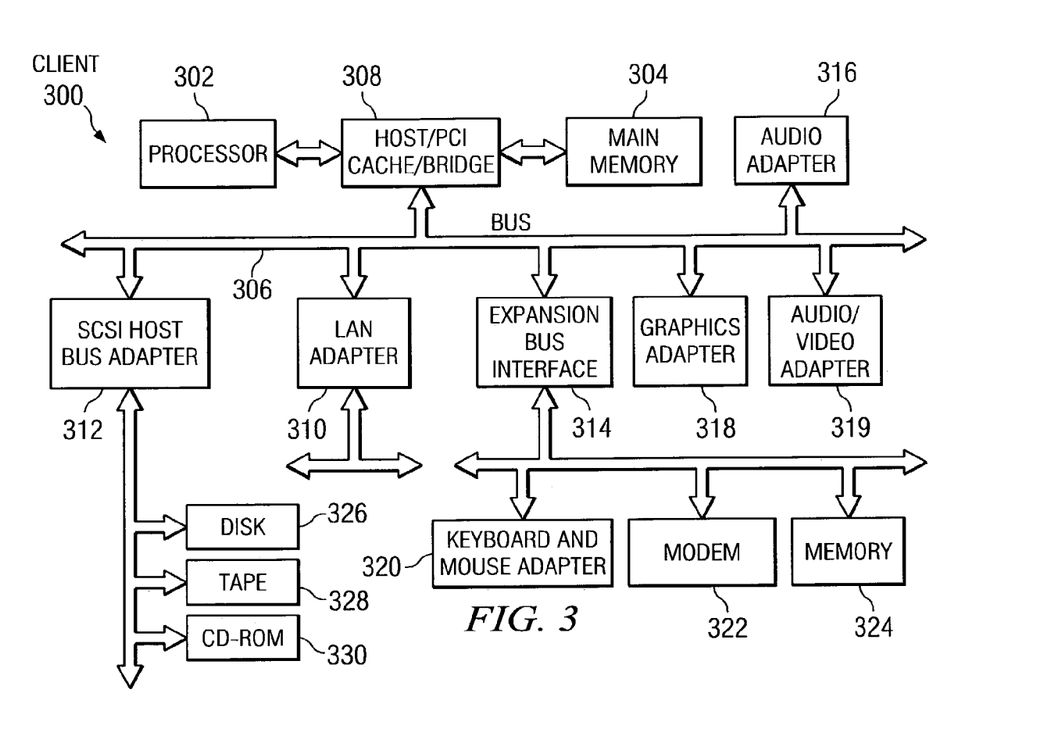
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a hardware management console, such as console 264 in FIG. 2.

Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. Instructions for the operating system and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The present invention provides an improved method, apparatus, and computer instructions for recovering partition configuration data for a logical partition data processing system, such as data processing system 100 in FIG. 1. The mechanism of the present invention begins recovery procedures when corruption or loss of configuration data is detected. As used herein, damage to partition configuration data occurs when the configuration data is corrupted or lost. The loss of configuration data may occur when the storage in which this data is located is cleared by processes in the logical partitioned data processing system. The mechanism of the present invention checks partitions already existing in the service processor and prevents those partitions from being deleted or stopped in the recovery process. The backup configuration data is examined. If an existing partition in the service processor has its configuration data in the backup image, that data is restored without stopping the running partitions. If partitions exist in the backup image, but not in the service processor, those partitions are created in the service processor with their configuration data being set up according to the backup image. This mechanism may be implemented in a configuration restore process.

Figure 4:
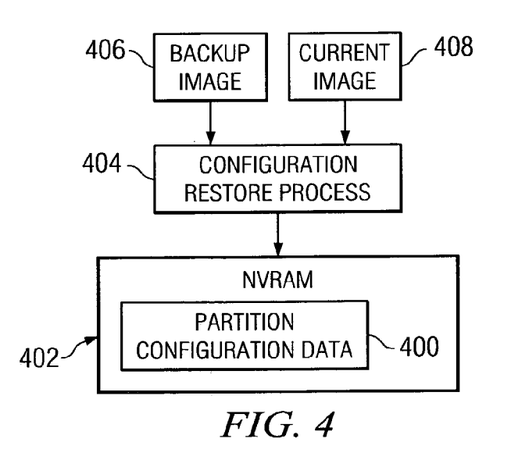
FIG. 4 is a diagram illustrating components used to recover or restore partition configuration data without interrupting current operations running on partitions in accordance with a preferred embodiment of the present invention.

With reference now to FIG. 4, a diagram illustrating components used to recover or restore partition configuration data without interrupting current operations running on partitions is depicted in accordance with a preferred embodiment of the present invention. In this example, partition configuration data 400 is stored on NVRAM 402. This information is stored in the NVRAM of a service processor, such as NVRAM 192 in FIG. 1. If partition configuration data 400 is damaged by being corrupted or cleared, configuration restore process 404 will recreate or restore partition configuration data 400. Configuration restore process 404 will look to backup image 406 and current image 408 in performing a restoration process.

Current image 408 is updated or made every time a user has made a configuration data change on a partition. Current image 408 is essentially a mirror image of partition configuration data 400. This image contains information about the partitions that have been created, the type of partition, profiles users created for the partition, and the name of the partition. Current image 408 should mirror the information in partition configuration data 400. Situations exist, however, in which current image 408 may be out of synchronization with partition configuration data 400. The image on the hardware management console can be out of synchronization if users have been using another hardware management console to modify configuration data. If the hardware management console used to update the configuration last is not available to execute the recover action, the profile data on the other hardware management is out of synchronization. Backup image 406 is an image of partition configuration data that has been saved by a user at one point in time.

If partition configuration data 400 is damaged, such a situation does not mean that the partitions running on the logical partitioned data processing system have been destroyed or terminated This situation indicates that the partition configuration data defined by the users are no longer present, is incomplete, or is corrupted in NVRAM 402. At this time, users may execute a recovery operation through configuration restore process 404 in order to continue to use the hardware management console to manage the system.

As part of the restore process, the users select a backup image, such as backup image 406 that had been previously saved. If no conflict is present between backup image 406 and current image 408, backup image 406 is used to restore partition configuration data 400 in NVRAM 402. If a conflict between these two images is present and affinity partitions are present, a straight merger between backup image 406 and current image 408 may cause a partition that is still executing to terminate or halt execution. This merger gives back-up image 406 priority in these examples.

Configuration restore process 404 performs this recovery without interrupting operations in partitions that are still running. Partitions existing in the service processor are checked. Those partitions are not stopped or deleted. The configuration data between backup image 406 and current image 408 are merged in a manner that avoids causing a partition that is running to stop execution or fail.

Such a situation put systems in inconsistent states. A user may not be able to recover the system from this situation. As a result, users will not be able to continue on using hardware management system to manage the partitions. In order to get out of this situation without using the mechanism of the present invention, users have to initialize the system which in turn stops all running partitions, delete them, and create them according to the configuration users have saved away. With the present invention, a recovery of the image on the hardware management system may be made without requiring reinitialization of the system. In this manner, partitions may continue to run without being stopped and having profiles for those partitions being recreated.

Figure 5:
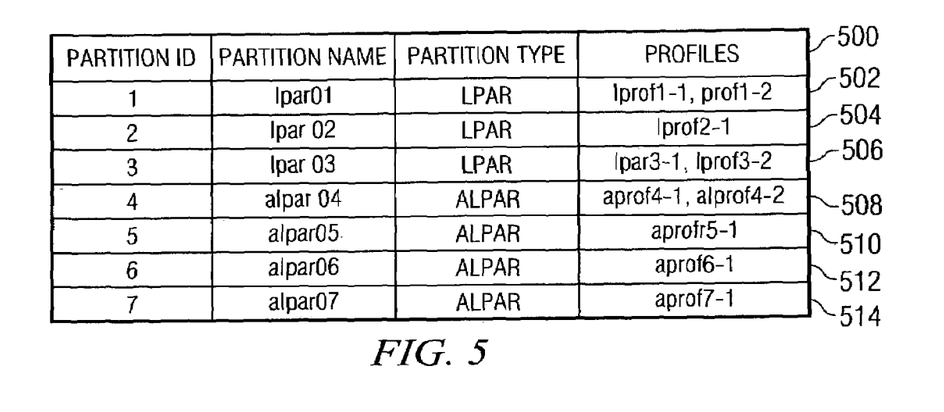
FIG. 5 is a diagram of information in a backup image in accordance with a preferred embodiment of the present invention.

With reference now to FIG. 5, a diagram of information in a backup image is depicted in accordance with a preferred embodiment of the present invention. Backup image 500 is an example of a backup image, such as backup image 406 in FIG. 4. In this example, image 500 includes entries 502, 504, 506, 508, 510, 512, and 514. Each of these entries includes information, such as partition identifier, partition name, partition type, and partition profiles.

Figure 6:
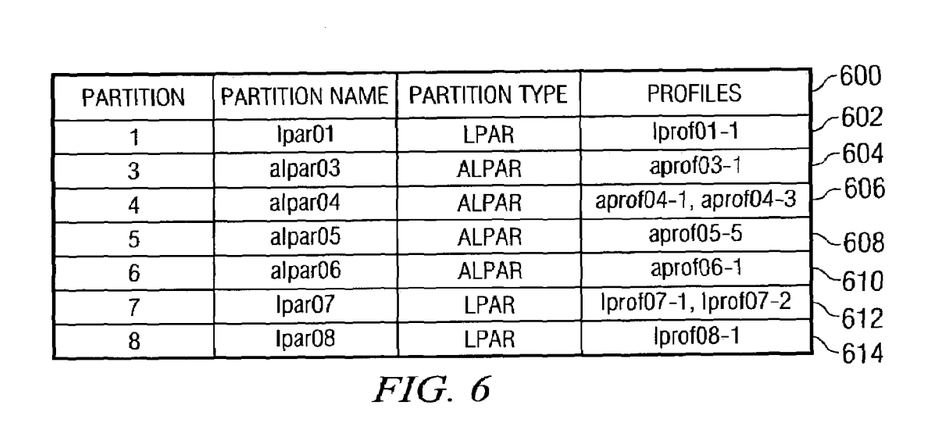
FIG. 6 is a diagram of information in a current image in accordance with a preferred embodiment of the present invention.

In FIG. 6, a diagram of information in a current image is depicted in accordance with a preferred embodiment of the present invention. Current image 600 is an example of a current image, such as current image 408 in FIG. 4. In this example, current image 600 includes current images 602,

604, 606, 608, 610, 612, and 614. In these examples, a partition type LPAR is a normal partition, while a partition type ALPAR is an affinity partition.

Figure 7:
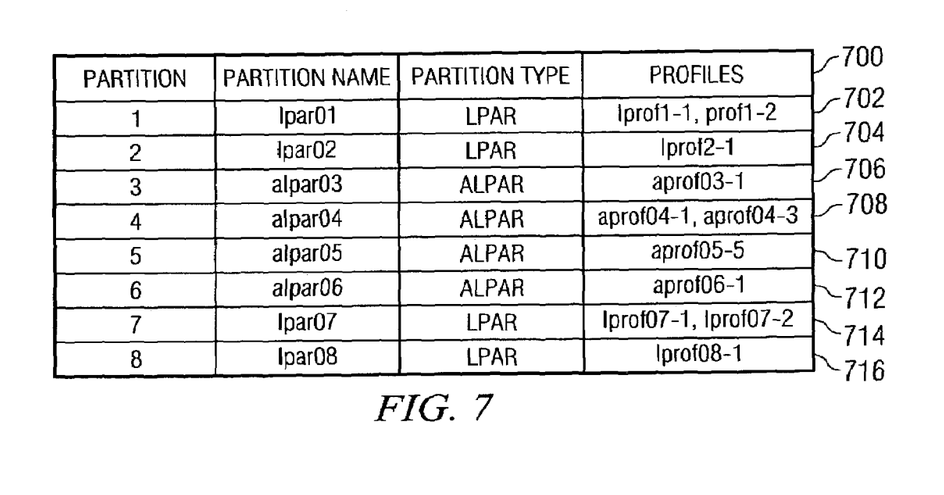
FIG. 7 is a diagram of a restored image in accordance with a preferred embodiment of the present invention.

Turning next to FIG. 7, a diagram of a restored image is depicted in accordance with a preferred embodiment of the present invention. Image 700 is an example of an image restored using backup image 500 in FIG. 5 and current image 600 in FIG. 6. This image is created using a recovery process that avoids having to interrupt operations on partitions that are still currently executing on the logical partitioned data processing system. In this example, image 700 includes entries 702, 704, 706, 708, 710, 712, 714, and 716.

Basically, for a particular partition, if the partition type is normal on the backup image, the partition information from the backup image is used. If this partition is not defined in the current image or the partition type in the current image is normal. Configuration data is used from the current image if the partition type is an affinity partition on the backup image or if the partition is defined on the backup image as being a normal partition, but the partition on the current image is defined as being an affinity partition.

For example, entry 702 is recreated using information from entry 502 because entry 502 in backup image 500 and entry 602 for the same partition ID defines the partition as a normal partition. In entry 706, this information is restored using information from entry 604 in current image 600 because the corresponding partition ID in entry 506 defines the partition type as normal while entry 604 defines the partition type as affinity. This recovery process is described in more detail below with respect to the flowchart in FIG. 8.

Figure 8:
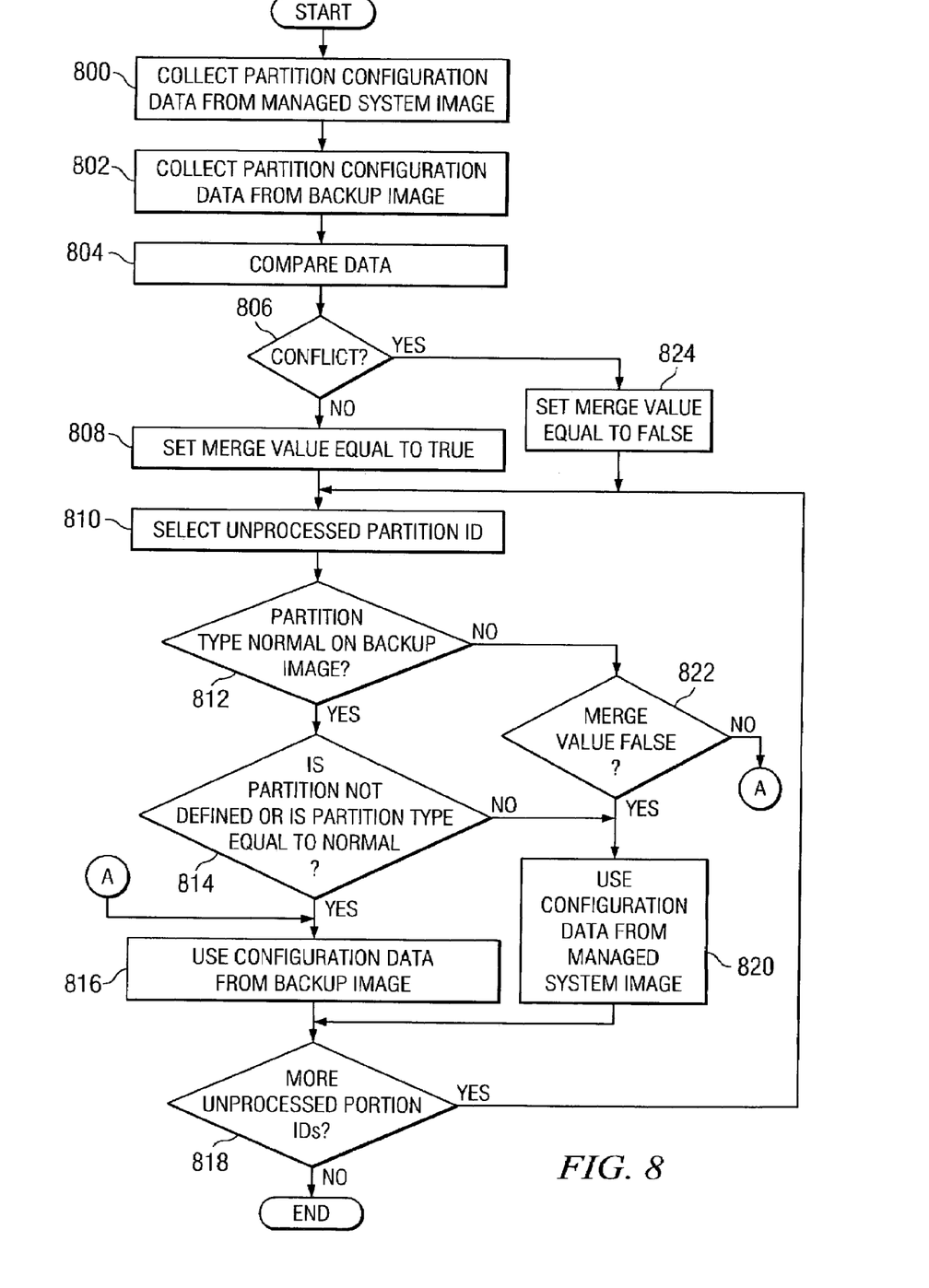
FIG. 8 is a flowchart of a process for recovering configuration data in a logical partition data processing system in accordance with a preferred embodiment of the present invention.

With reference now to FIG. 8, a flowchart of a process for recovering configuration data in a logical partition data processing system is depicted in accordance with a preferred embodiment of the present invention. The process illustrated in FIG. 8 may be implemented in a recovery process, such as configuration restore process 404 in FIG. 4.

The process begins by collecting configuration data from the managed system image (step 800). This managed system image is an image, such current image 600 in FIG. 6. Partition configuration data is collected from the backup image (step 802). This backup image is an image, such as backup image 500 in FIG. 5. The data between the two images is compared (step 804). Then, a determination is made as to whether a conflict is present between the partition types for the different partition IDs (step 806). In some cases, the current or mirror image may not be entirely current with the configuration on the system. Such a situation may occur in different instances. For example, if a user has been using another hardware management console or restoring the hardware management console from an earlier made backup, the current or mirror image may not contain an accurate image of the current configuration. If a conflict is present, a merge value is set equal to true (step 808).

Next, an unprocessed partition ID is selected for recovery (step 810). For this selected partition ID, a determination is made as to whether the partition type is normal on the backup image (step 812). If the partition type is normal, a determination is made as to whether the partition is not defined or if the partition type is normal on the managed system image (step 814). If either the partition type is not defined, or the partition type is normal on the managed system image, then configuration data from the backup image is used for this partition ID (step 816).

Next, a determination is made as to whether more unprocessed image IDs are present (step 818). If all of the partition IDs have been processed, the process terminates. Otherwise, the process returns to step 810 to select another partition ID for processing.

With reference again to step 814, if the partition is defined or the partition type is an affinity partition in the managed system image, configuration data from the managed system image is used for this partition ID (step 820), with the process then proceeding to step 818 as described above.

Turning back to step 812, if the partition type is affinity, rather than normal on the backup image, a determination is made as to whether the merge value is false (step 822). The merge value is false if a conflict is present between partition types for IDs in the backup image and the managed system image. If the merge value is false, the process proceeds to step 820 as described above. Otherwise, the process proceeds to step 816. With reference again to step 806, if a conflict is present, the merge value is set to false (step 824), with the process then proceeding to step 810 as described above.

The merger system provided by the merger process in FIG. 8 avoids generating too many affinity partition definitions in the restored image. With a straight merger, more affinity partitions may be created than allowed, potentially causing inconsistencies in the system. Further, this recovery is made without having to interrupt operations in currently running partitions.

The process in FIG. 8 does not overwrite any partition types that are currently defined in the system. This process also determines whether a conflict occurs between the backup image and the mirror image. The mechanism embodied within this process prevents inconsistencies or conflicts that occur with a simple merge. Previously, when such inconsistency or conflict is present, the hardware management console in some cases is unable to handle this situation, requiring users to synchronize the configuration during which the partitions must be stopped. Further, with the previous mechanism, overwriting of the partition type may cause problems if a user is manipulating a resource on the partition. By changing the type, the user may no longer be able to continue with this operation. This situation also requires stopping the partition to synchronize the configuration. The process illustrated in FIG. 8 avoids this situation through its merger steps as described above.

Thus, the present invention provides an improved method, apparatus, and computer instructions for recovering partition configuration data without interrupting current operations running on partitions still executing on the logical partition data processing system. The mechanism of the present invention checks for partitions still executing on the logical partition data processing system. Those currently present partitions are not deleted or stopped in the recovery process. Further, the restoration or reconstruction of the partition configuration data is made in a manner that avoids causing errors that may terminate or cause partitions to fail.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for recovering an image of partition configuration information data for a set of partitions having at least one affinity partition, the method comprising:
   detecting damage to an image of partition configuration data;
   comparing current partition data with a backup partition data; and
   performing a merger of the current partition configuration data with the backup logical partition data if a conflict is present between the current partition configuration data and the backup partition data, wherein merger is performed in a manner avoiding stopping an operation on a running partition in the set of partitions.

2. The method of claim 1, wherein the performing step comprises:
   using current partition configuration data for a partition in the set of partitions to restore the image of configuration data if the partition is defined as an affinity partition in the current logical partition data; and using backup partition configuration data to restore the image of configuration information for the partition if the partition in defined as a normal partition in the current partition configuration data and in the backup partition configuration data; and
   using the backup partition configuration data to restore the image of configuration information of the partition if the partition defined as normal in the backup partition configuration data is undefined or defined as normal in the current partition configuration data.

3. The method of claim 1 wherein the current logical partition data is stored in a non-volatile memory.

4. The method of claim 1, wherein the backup logical partition data is stored in a backup image created by a user previously storing logical partition data.

5. The method of claim 1, wherein the current logical partition data is stored in a mirror image.

6. The method of claim 1 further comprising:
   using the backup partition configuration data if a conflict is absent.

7. A method in a data processing system for recovering an image of partition configuration information for a set of partitions, the method comprising:
   comparing current partition configuration data with a backup partition configuration data to determine if a conflict is present;
   using current partition configuration data to restore configuration data for a partition in the set of partitions if a conflict is present and data if the partition is defined as an affinity partition in the current partition configuration data; and
   using backup partition configuration data to restore the image of configuration information for the partition if a conflict is present and if the partition in defined as a normal partition in the current partition configuration data and in the backup partition configuration data; and
   using the backup partition configuration data to restore the image of configuration information of the partition if a conflict is present and if the partition defined as normal in the backup partition configuration data is undefined or defined as normal in the current partition configuration data.

8. A data processing system for recovering an image of partition configuration information data for a set of partitions having at least one affinity partition, the data processing system comprising:
   detecting means for detecting damage to an image of partition configuration data;
   comparing means for comparing current partition data with a backup partition data; and
   performing means for performing a merger of the current partition configuration data with the backup logical partition data if a conflict is present between the current partition configuration data and the backup partition data, wherein merger is performed in a manner avoiding stopping an operation on a running partition in the set of partitions.

9. The data processing system of claim 8, wherein the performing means comprises:
   first using means for using current partition configuration data for a partition in the set of partitions to restore the image of configuration data if the partition is defined as an affinity partition in the current logical partition data; and
   second using means for using backup partition configuration data to restore the image of configuration information for the partition if the partition in defined as a normal partition in the current partition configuration data and in the backup partition configuration data; and
   third using means for using the backup partition configuration data to restore the image of configuration information of the partition if the partition defined as normal in the backup partition configuration data is undefined or defined as normal in the current partition configuration data.

10. The data processing system of claim 8, wherein the current logical partition data is stored in a non-volatile memory.

11. The data processing system of claim 8, wherein the backup logical partition data is stored in a backup image created by a user previously storing logical partition data.

12. The data processing system of claim 8, wherein the current logical partition data is stored in a minor image.

13. The data processing system of claim 8 further comprising:
   using means for using the backup partition configuration data if a conflict is absent.

14. A data processing system for recovering an image of partition configuration information for a set of partitions, the data processing system comprising:
   comparing means for comparing current partition configuration data with a backup partition configuration data to determine if a conflict is present;
   first using means for using current partition configuration data to restore configuration data for a partition in the set of partitions if a conflict is present and data if the partition is defined as an affinity partition in the current partition configuration data; and second using means for using backup partition configuration data to restore the image of configuration information for the partition if a conflict is present and if to partition in defined as a normal partition in the current partition configuration data and in the backup partition configuration data; and third using means for using the backup partition configuration data to restore the image of configuration information of the partition if a conflict is present and if the partition defined as normal in the backup partition configuration data is undefined or defined as normal in the current partition configuration data.

15. A data processing system for recovering an image of partition configuration information data for a set of partitions having at least one affinity partition, the data processing system comprising:

a bus system;

a memory connected to the bus system, wherein the memory includes a set of instructions;

a processing unit connected to the bus system, wherein the bus system executes the set of instructions to detect damage to an image of partition configuration data; compare current partition data with a backup partition data when the damage is detected; and perform a merger of the current partition configuration data with the backup logical partition data if a conflict is present between the current partition configuration data and the backup partition data, wherein merger is performed in a manner avoiding stopping an operation on a running partition in the set of partitions.

16. A data processing system for recovering an image of partition configuration information for a set of partitions, the data processing system comprising:

a bus system;

a memory connected to the bus system, wherein the memory includes a set of instructions;

a processing unit connected to the bus system, wherein the bus system executes the set of instructions to compare current partition configuration data with a backup partition configuration data to determine if a conflict is present; use current partition configuration data to restore configuration data for a partition in the set of partitions if a conflict is present and data if the partition is defined as an affinity partition in the current partition configuration data; and use backup partition configuration data to restore the image of configuration information for the partition if a conflict is present and if the partition in defined as a normal partition in the current partition configuration data and in the backup partition configuration data; and use the backup partition configuration data to restore the image of configuration information of the partition if a conflict is present and if to partition defined as normal in the backup partition configuration data is undefined or defined as normal in the current partition configuration data.

17. A computer program product in a computer recordable readable medium for recovering an image of partition configuration information data for a set of partitions having at least one affinity partition, the computer program product comprising:

first instructions for detecting damage to an image of partition configuration data;

second instructions for comparing current partition data with a backup partition data; and third instructions for performing a merger of the current partition configuration data with the backup logical partition data if a conflict is present between the current partition configuration data and the backup partition data, wherein merger is performed in a manner avoiding stopping an operation on a running partition in the set of partitions.

18. A computer program product in a computer recordable readable medium for recovering an image of partition configuration information for a set of partitions, the method comprising:

first instructions for comparing current partition configuration data with a backup partition configuration data to determine if a conflict is present;

second instructions for using current partition configuration data to restore configuration data for a partition in the set of partitions if a conflict is present and data if the partition is defined as an affinity partition in the current partition configuration data; and third instructions for using backup partition configuration data to restore the image of configuration information for the partition if a conflict is present and if the partition in defined as a normal partition in the current partition configuration data and in to backup partition configuration data; and fourth instructions for using the backup partition configuration data to restore the image of configuration information of the partition if a conflict is present and if the partition defined as normal in the backup partition configuration data is undefined or defined as normal in the current partition configuration data.

* * * * *